(12) United States Patent
Strand

(10) Patent No.: US 9,256,340 B1
(45) Date of Patent: *Feb. 9, 2016

(54) PLACEMENT OF USER INTERFACE ELEMENTS BASED ON USER INPUT INDICATING A HIGH VALUE AREA

(71) Applicant: Amazon Technologies, Inc., Reno, NV (US)

(72) Inventor: William Alexander Strand, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 412 days.

This patent is subject to a terminal disclaimer.

(21) Appl. No.: 13/764,494

(22) Filed: Feb. 11, 2013

Related U.S. Application Data

(63) Continuation of application No. 12/780,469, filed on May 14, 2010, now Pat. No. 8,375,305.

(51) Int. Cl.
  *G06F 3/00* (2006.01)
  *G06F 3/048* (2013.01)

(52) U.S. Cl.
  CPC ...................................... *G06F 3/048* (2013.01)

(58) Field of Classification Search
  None
  See application file for complete search history.

(56) References Cited

U.S. PATENT DOCUMENTS

| | | | |
|---|---|---|---|
| 6,563,514 B1 | 5/2003 | Samar | |
| 7,028,001 B1 | 4/2006 | Muthuswamy et al. | |
| 7,693,869 B2 | 4/2010 | Hutson et al. | |
| 7,756,887 B1 | 7/2010 | Haveliwala | |
| 8,126,930 B2 | 2/2012 | Shukla et al. | |
| 8,375,305 B1 | 2/2013 | Strand | |
| 2002/0111865 A1 | 8/2002 | Middleton et al. | |
| 2002/0138331 A1 | 9/2002 | Hosea et al. | |
| 2003/0149938 A1 | 8/2003 | McElfresh et al. | |
| 2004/0156020 A1 | 8/2004 | Edwards | |
| 2004/0215511 A1 | 10/2004 | Ehrich et al. | |
| 2004/0267806 A1 | 12/2004 | Lester | |
| 2008/0046562 A1* | 2/2008 | Butler | 709/224 |
| 2008/0228910 A1 | 9/2008 | Petri | |
| 2008/0282176 A1 | 11/2008 | Bates et al. | |
| 2009/0158166 A1 | 6/2009 | Dewar et al. | |
| 2010/0082423 A1 | 4/2010 | Nag et al. | |
| 2010/0251128 A1 | 9/2010 | Cordasco | |
| 2010/0287028 A1 | 11/2010 | Hauser | |
| 2010/0295774 A1 | 11/2010 | Hennessey | |
| 2011/0137737 A1 | 6/2011 | Baird et al. | |
| 2011/0153435 A1 | 6/2011 | Pisaris-Henderson | |

OTHER PUBLICATIONS

Sanjeev Mishra, "How to Increase Income Thru Adsense by Doing Simple Changes", May 28, 2009, <www.clickonf5.org/2402/how-increase-income-thr-adsense/> (accessed Apr. 26, 2012).*

(Continued)

*Primary Examiner* — Scott Baderman
*Assistant Examiner* — Asher Kells
(74) *Attorney, Agent, or Firm* — Thomas | Horstemeyer, LLP

(57) ABSTRACT

Disclosed are various embodiments for placing user interface elements in a network page. A first network page is generated with client side code embedded therein that can track navigation input data associated with the user. The navigation input data can be interpreted to determine whether the user has a tendency to idle an input device in a particular area of the network page or exhibit any other behavior that allows a high value area to be identified.

20 Claims, 10 Drawing Sheets

(56) References Cited

OTHER PUBLICATIONS

Richard Atterer, Monika Wnuk, and Albrecht Schmidt. 2006. Knowing the user's every move: user activity tracking for website usability evaluation and implicit interaction. In Proceedings of the 15th international conference on World Wide Web (WWW '06). ACM, New York, NY, USA, 203-212.*

Arroyo, Ernest et al.; "Usability Tool for Analysis of Web Designs Using Mouse Tracks"; Apr. 22, 2006; CHI 2006; pp. 484-489.

* cited by examiner

FIG. 4

PLACEMENT OF USER INTERFACE ELEMENTS BASED ON USER INPUT INDICATING A HIGH VALUE AREA

CROSS-REFERENCE TO RELATED APPLICATION

This application claims the benefit of and is a continuation of U.S. patent application Ser. No. 12/780,469, filed May 14, 2010 and entitled "Placement of User Interface Elements Based on a Window Entry or Exit Point," which is hereby incorporated herein by reference in its entirety.

BACKGROUND

Users of a content delivery system often interact with the system via a network on a client. Users often manipulate a user interface on a client that is in the form of a network page encoded by the content system. User interface elements are often placed away from where a user has a tendency to hover an input device and/or mouse pointer. Content systems are often unable to customize a network page encoded for a client, and important user interface elements can be located some distance away from where a user has a tendency to locate a mouse pointer.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 4 is a drawing of a network page generated in the networked environment of FIG. 1 according to various embodiment of the present disclosure.

DETAILED DESCRIPTION

Embodiments of this disclosure are directed to systems and methods that facilitate placement of user interface elements on a content page and/or network page. The embodiments described herein can encode a network page that is transmitted to and rendered on a client that also facilitates the tracking of movement of an input device in communication with the client. Accordingly, embodiments of the disclosure can identify one or more high value areas in a browser window associated with a browser executed on the client to view a network page. These high value areas can include areas associated with a browser window where, as one example, a user has a tendency to idle a pointer associated with an input device. Other examples shall be discussed herein, but embodiments of this disclosure can detect user tendencies associated with an input device and adjust placement of user interface elements to suit these tendencies.

Figure 1:
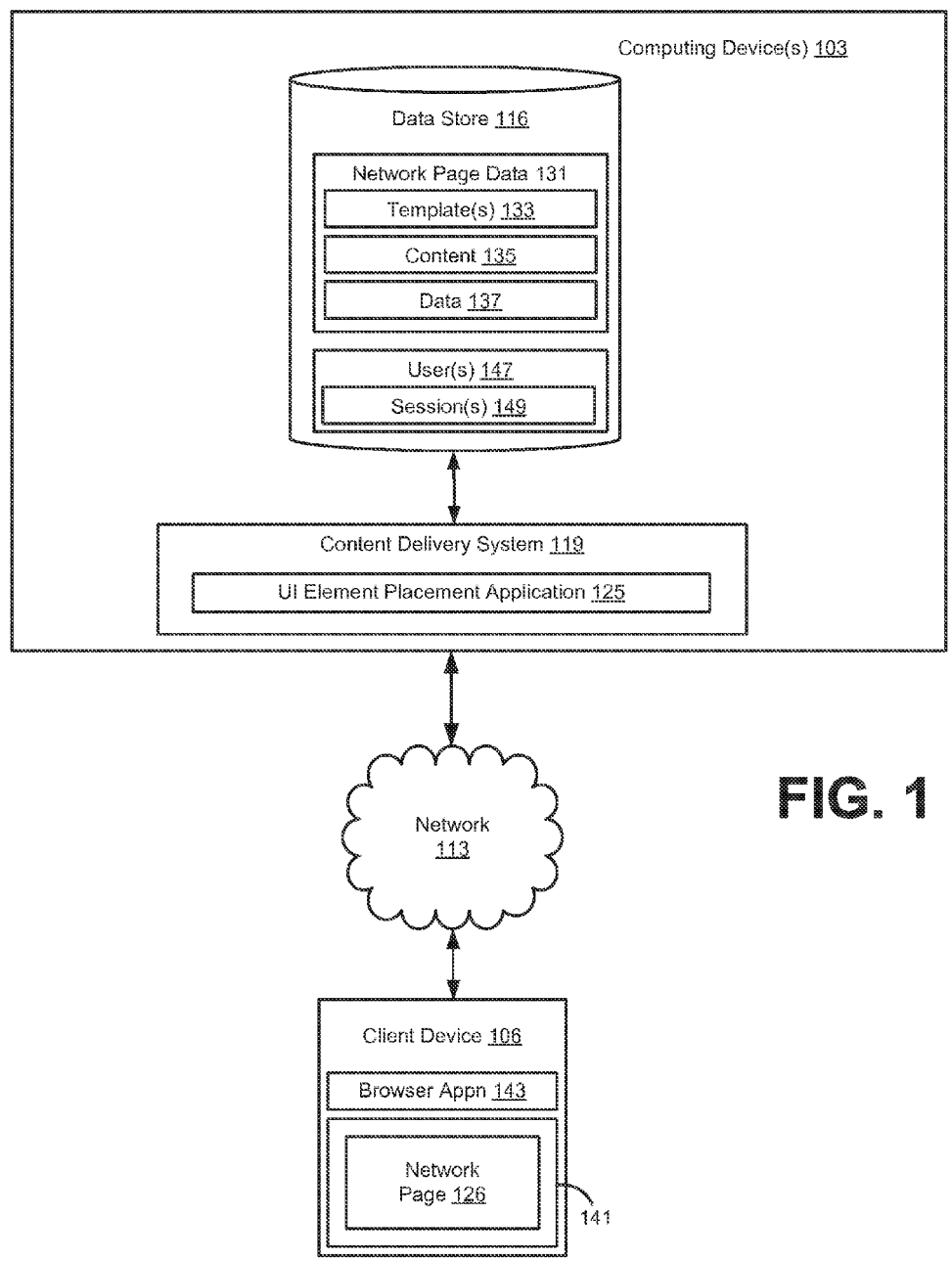
FIG. 1 is a drawing of a networked environment according to various embodiments of the present disclosure.

Accordingly, with reference to FIG. 1, shown is a networked environment 100 according to various embodiments. The networked environment 100 includes one or more computing devices 103, and one or more client devices 106 coupled to a network 113. The network 113 includes, for example, the Internet, intranets, extranets, wide area networks (WANs), local area networks (LANs), wired networks, wireless networks, or other suitable networks, etc., or any combination of two or more such networks.

The computing device(s) 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. In one embodiment, the computing device 103 represents a virtualized computer system executing on one or more physical computing systems. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 116 that is accessible to the computing device 103. The data store 116 may be representative of a plurality of data stores as can be appreciated. The data stored in the data store 116, for example, is associated with the operation of the various applications and/or functional entities described below. In one embodiment, the data store 116 can be implemented in one computing device 103, and the other elements depicted can be implemented in other computing devices 103 as can be appreciated.

The content delivery system 119 is one example of an application that is executed on a computing device 103 in order to provide browser access to content that is served over the network 113. To this end, the content delivery system 119 acts as a gateway through which requests are received and responses transmitted to the clients 106. It is understood that other applications and components, such as, an application implementing the hypertext transport protocol, may be executed on the computing device 103 beyond those described herein.

The computing device 103 may, in some embodiments, provide many different applications that are involved, for example, in providing services offered by an online merchant, a search engine, or other services that involve delivering content over a network 113. For example, the computing device 103 may execute applications that facilitate the ordering of goods online by customers by manipulating a user interface on a client 106. The computing device 103 may also execute a search engine, search indexer, etc., that facilitate the functionality of a search engine.

The content delivery system 119 can facilitate the generating of dynamic network pages such as, for example, dynamic web pages that are provided to clients 106 in response to various requests. In order to provide network pages, the content delivery system 119 may access the data store 116 to obtain network page data 131, which can include network page templates 133, various content items 135, and data 137. The network page templates 133 act as templates of network pages, such as dynamic network pages that may ultimately be populated with the content 135 and data 137 also stored within the data store 116 or in some way accessible to the content delivery system 119. The content items 135 can specify user interface elements that are arranged in a network page, such as, but not limited to, imagery, a page header, form elements (e.g., text entry fields, buttons, etc.), and other user interface elements as can be appreciated. As contemplated herein, the data store 116 may be representative of many different data stores included in a given system. The data store 116 may comprise, for example, a database or other data storage structure.

The network page templates 133 can specify the placement of user interface elements with which a user on a client 106 can interact. As a non-limiting example, in an online merchant site implemented by the content delivery system 119, the network page template 133 can specify the placement of text, imagery, buttons, etc., which can include user interface elements that facilitate the purchase of an item (e.g., an "Add to Cart" button). As an alternative example, network templates 133 for a search engine implemented by the content delivery system 119 can specify where imagery, search forms, search results, etc. are placed on a network page generated by the content delivery system 119 for a user on a client 106. To facilitate the placement of user interface elements according to embodiments of the disclosure, the computing device 103 can also execute a user interface element placement application 125. The user interface element placement application 125 can facilitate tracking of navigation input data caused by a user interacting with a client 106. Depending on the navigation input data received from a client 106, the user interface element placement application 125 can detect high value areas of a browser window in which user interface elements can be placed.

The data store 116 can also include data about users 147 of the content delivery system 119. In some embodiments, each user 147 can be associated with various identification data, profile data, or other data about the user. Additionally, session 149 data can be stored for each user 147 in a content delivery system 119, which can store data regarding navigation input data captured during one or more sessions associated with the user 147. For example, the content delivery system 119 can capture data relating to movement of an input device (e.g., a mouse, a keyboard, etc.) and store it in session 149 data associated with the user 147. In this way, the content delivery system 119 can tailor a user interface in a network page generated for the user, as will be described in further detail herein.

The client device 106 is representative of a plurality of client devices 106 that may be coupled to the network 113. The client device 106 may comprise, for example, a processor-based system, such as a computer system. Such a computer system may be embodied in the form of a desktop computer, a laptop computer, a personal digital assistant, a mobile device (e.g. cellular telephone, smart phone, etc.), set-top box, music players, web pads, tablet computer systems, or other devices with like capability. The client device 106 includes a display device 141 upon which various network pages 126 and other content may be rendered.

The client device 106 may be configured to execute various applications, such as a browser application 143 and/or other applications. The browser application 143 may be executed in a client device 106, for example, to access and render network pages 126, such as web pages, or other network content served up by the computing device 103 and/or other servers. The client device 106 may be configured to execute applications beyond browser application 143 such as, for example, an email client for receiving email generated by the content delivery system 119, instant message applications, an application specifically tailored to access resources of the computing device 103, and/or other applications. In embodiments of the present disclosure, a user on a client 106 can purchase and/or view products via the content delivery system 119 executed by the computing device 103 by manipulating a user interface rendered on the client 106.

A network page 126 may be, for example, a dynamic network page such as a dynamic web page or other type of network page. For example, while navigating through the various network pages 126 made available through the content delivery system so as to order various goods, the browser application 143 may send a request for a specific network page 126 to the content delivery system 119. The content delivery system 119 interfaces with the appropriate application(s) executed on the computing device 103 as well as any data stores 116 containing data necessary to encode a network page 126 to generate the desired network page 126 that is then transmitted to the browser application 143 executed on the client 106. In one embodiment, the content delivery system 119 can obtain a network page template 133 corresponding to a requested network page 126 and populate the network page template 133 as well as various content 135 and other data 137 needed to generate the network page 126.

Next, a general description that provides one example of the operation of the various components of the networked environment 100 is provided. The content delivery system 119 can deliver a network page 126 over a network 113 for viewing by a user on a client 106 in a browser application 143. As noted above, the content delivery system 119 can facilitate any type of content system, such as an electronic commerce system, a search engine, a blog network, and others as can be appreciated. In one embodiment of this disclosure, the content delivery system 119 can generate a network page 126 for transmission to a client that includes code which allows the content delivery system 119 to receive data regarding the navigation input of a user as the user interacts with the network page 126 in the browser application 143. The user interface element placement application 125 can identify high values areas of a network page 126 and/or browser window of the browser application 143. These high value areas can be identified based at least upon on the behavior of the user as interpreted through the navigation input data received from the client 106. User interface elements to which an operator desires for a user to be drawn to and with which the operator desires a user to interact.

As one example, the content delivery system 119 can embed code within a network page 126 that tracks a position of a pointer associated with an input device (e.g., a mouse, a touchscreen, etc.) and transmits the location of the pointer within a browser window in which the network page 126 is rendered to the user interface element placement application 125. In one embodiment, the content delivery system 119 can embed Javascript code in the network page 126 to accomplish the above, and other languages should be appreciated. The user interface element placement application 125 can then analyze the navigation input data received from the client 106 in order to identify high value areas of the browser window as well as determine placement of user interface elements in the high value areas for successive network pages 126 that are encoded by the content delivery system 119 and transmitted to the client 106. In one embodiment, the embedded code can sample a mouse pointer position on a periodic basis, and transmit the mouse pointer position to the user interface element placement application 125 as navigation input data of the user. Accordingly, this navigation input data that is collected and transmitted over time allows the user interface element placement application 125 to determine various aspects of the behavior and/or tendencies of the user's interactions with a network page 126 that is encoded by the content delivery system 119.

For example, the user interface element placement application 125 can determine if a user 147 has a tendency to hover a mouse pointer over a particular location in a browser window of the browser application 143 in which the network page 126 is rendered. In other words, the user may have a tendency to, when viewing and/or interacting with content in a network page 126, idle the mouse pointer over or near a particular area of a browser window displaying the network page 126. In this example, the user interface element placement application 125 can determine if navigation input data received from a client 106 rendering a network page 126 encoded by the content delivery system 119 reveals that the user positions a pointer in or near an area of the screen more often than others. If the application 125 makes such a determination, the user interface element placement application 125 can identify this area of a browser window as a high value area.

In the above example, the user interface element placement application 125 can be tuned with thresholds so that just because higher levels of navigation input occur in a particular area of a browser window relative to others, such behavior is not always identified as a user tendency that causes adjustment of placement of user interface elements. In other words, in one embodiment, the user interface element placement application 125 can be tuned such that the navigation input data received from the client 106 must reveal that the amount of navigation input in a particular area of a browser window exceeds the amount of input in other areas of the screen by a predefined threshold, such as a minimum percentage of time the user spends viewing the network page 126, so that false positive high value areas are not identified. As one example, the user interface element placement application 125 can be tuned such that in order to identify a high value area, the navigation input must reflect that the user hovers a mouse pointer over a one inch area of the browser window for at least fifty percent of the time the user spends viewing the network page 126. Other examples of establishing such predefined thresholds should be appreciated.

As another example of identifying high value areas of a network page 126, if the user has a tendency to idle the mouse pointer outside the browser window of the browser application 143 when viewing a network page 126, Javascript code or other client side code in a network page 126 can identify an entry point and/or exit point of the mouse pointer from the network page 126. The client side code embedded in the network page 126 by the content delivery system 119 can also identify the amount of time the mouse pointer is outside the browser window.

Accordingly, with this entry point and/or exit point data, the user interface element placement application 125 can determine whether the user causes a mouse pointer to exit and/or enter network page 126 rendered in the browser window in a particular area of the network page 126 more often than others. Such an area of the network page 126 can be identified as a high value area, as the area can correspond to an area off the network page 126 and/or browser window in which the user hovers a mouse pointer. The user interface element placement application 125 can identify a high value area on the basis of identifying an entry point, and an exit point, or a combination of both an entry point and an exit point that occurs in navigation input data received from the client 106 more than other entry points and/or exit points. The user interface element placement application 125 can also identify high value areas on the basis of entry points and/or exit points subject to predefined thresholds as described above.

As another example of identifying high values areas of a network page 126, the user interface element placement application 125 can determine an area of the network page 126 in which a higher level of navigation input occurs relative to other areas of the network page 126. Accordingly, in contrast to the above examples, which are based on identifying those areas within or outside a network page 126 in which a user, in one non-limiting example, idles a mouse pointer, the user interface element placement application 125 can determine whether the navigation input data reveals an area of the network page 126 in which a user provides high levels of navigation input.

Accordingly, in one embodiment, when a user 147 requests a network page 126 via a client 106, the content delivery system 119 can establish a session 149 that corresponds to the user 147 in the data store 116. The user interface element placement application 125 can receive navigation input data from the client 106 and store the navigation input data in session 149 data in the data store 116. The user interface element placement application 125 can analyze session data across a plurality of network page 126 views associated with a user in order to identify high value areas of a browser window in which a network page 126 is rendered on a client. In this way, the user interface element placement application 125 can identify high value areas by analyzing navigation input data associated with one or more sessions of a user, which can include many network page 126 views. Accordingly, high value areas of a browser window associated with a particular user can be more accurate than an identification of high value areas based upon analysis of a single network page 126 view. Additionally, the user interface element placement application 125 can identify high value areas associated with navigation input data of a user 147 and store the high value areas in the data store 116. Therefore, the content delivery system 119 can place user interface elements in high value areas each time the user 147 accesses a network site served by the content delivery system 119.

Figure 2:
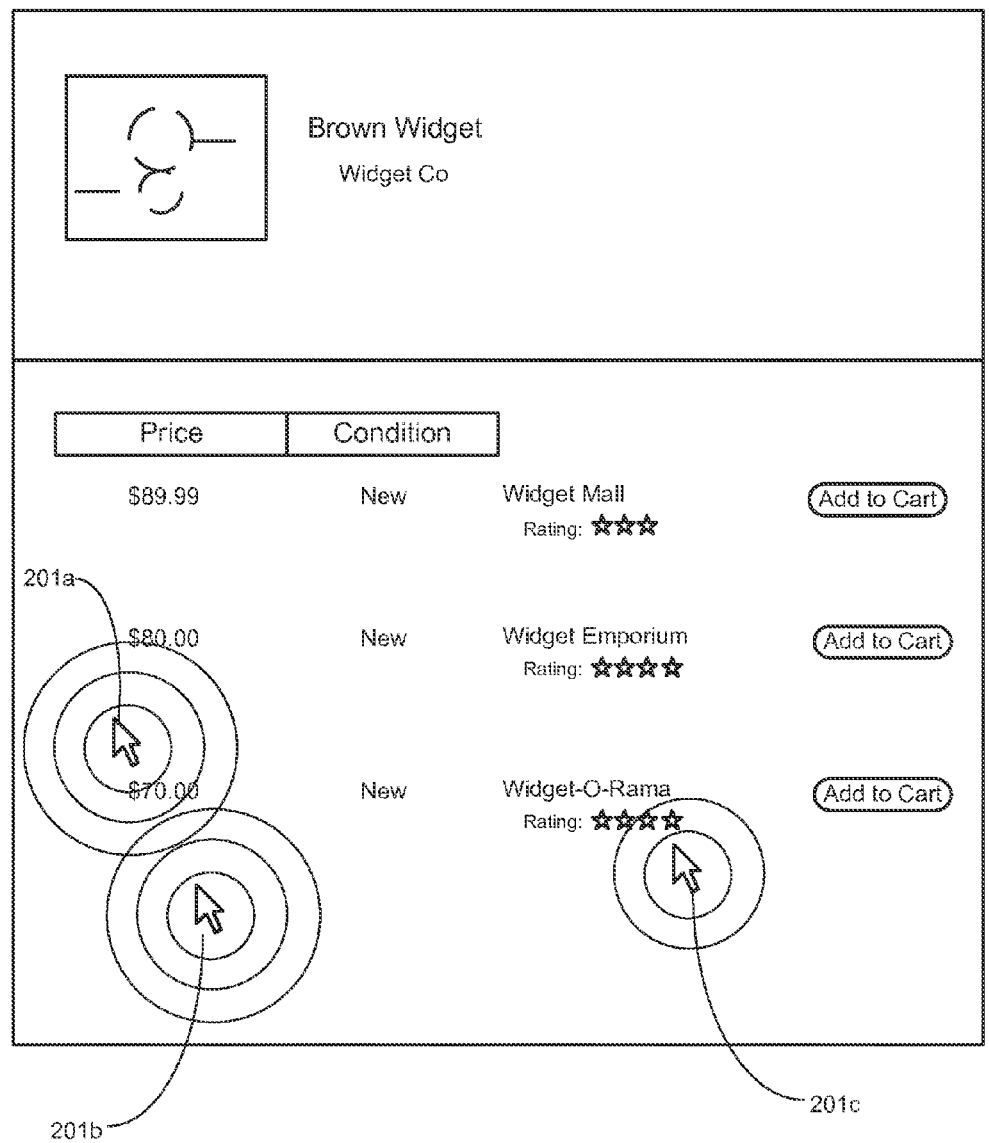
FIG. 2 is a drawing of a network page generated in the networked environment of FIG. 1 according to various embodiment of the present disclosure.

Reference is now made to FIG. 2, which continues discussion of the identification of high value areas of a network page 126 as well as placement of user interface elements in the identified high value areas. FIG. 2 depicts a network page 126 generated by the content delivery system 119 and transmitted to a client 106 (FIG. 1). In the illustrated example, the network page 126 can include client side code, such as Javascript code, that detects a location of a mouse pointer on a periodic basis and transmits navigation input data that reflects the location of the mouse pointer across a session 149 and/or page view to the user interface element placement application 125.

In the depicted example, the user interface element placement application 125 can determine, based on at least the navigation input data received from the client 106, that a user idled the mouse pointer 201 in the depicted locations in varying degrees. These varying degrees, for ease of depiction, are illustrated by the varying levels of concentric circles around the depicted mouse pointers 201. Accordingly, upon identifying the areas in which the mouse pointer 201 is left idle by a user and the varying degrees to which the mouse pointer 201 is left idle in these areas, the user interface element placement application 125 can generate a navigation input data map, which is depicted in FIG. 3.

Figure 3:
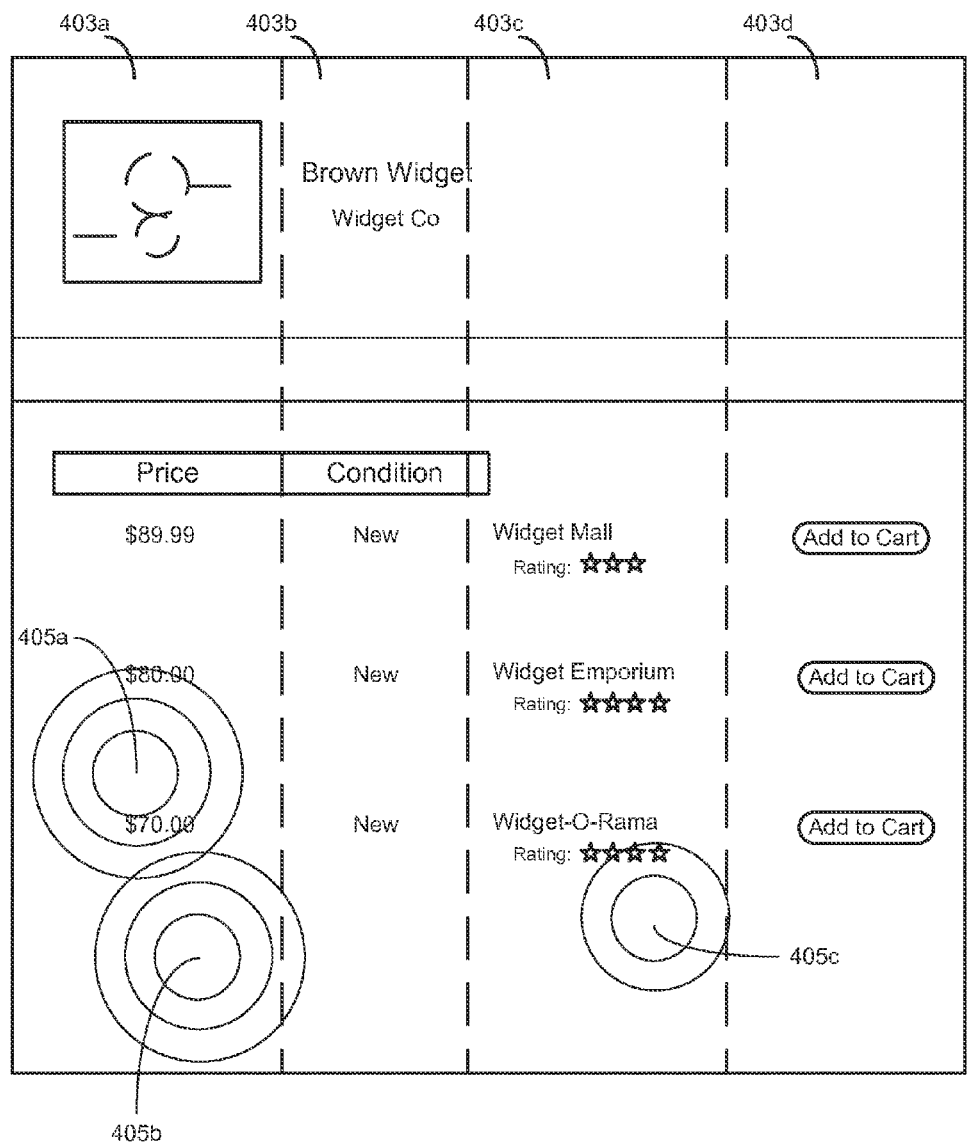
FIG. 3 is a drawing of a navigation input data map generated by the user interface placement application in the networked environment of FIG. 1 according to various embodiment of the present disclosure.

Reference is now made to FIG. 3, which depicts a non-limiting illustration of a navigation input data map by the user interface element placement application 125 that is employed to identify high value areas of the network page 126 and/or browser window of a browser application 143. In the depicted example, the user interface element placement application 125 can divide the network page 126 into various zones 403, and identify which zone 403 an identified high value area falls within. In the example of FIGS. 2 and 3, the user interface element placement application 125 is identifying high values areas of a network page 126 based at least upon one or more areas 405 in which the user idles a mouse pointer most often during a page view, a session, and/or across multiple sessions. Therefore, in the depicted example, the user interface element placement application 125 has determined that the user has idled the mouse pointer most often in the areas 405a, 405b, so these areas 405a, 405b can be identified as high value areas.

Accordingly, the user interface element placement application 125 can identify a zone 403a of the network page 126 in which the high value areas are located. It should be appreciated that the high value areas could span multiple zones 403 of the network page 126, and that the user interface element placement application 125 could therefore identify multiple zones 403 in which high value areas appear. Upon identifying the zone 403a in which the one or more high value areas are located, the user interface element placement application 125 can, in coordination with the content delivery system 119, facilitate placement of user interface elements.

Figure 4:
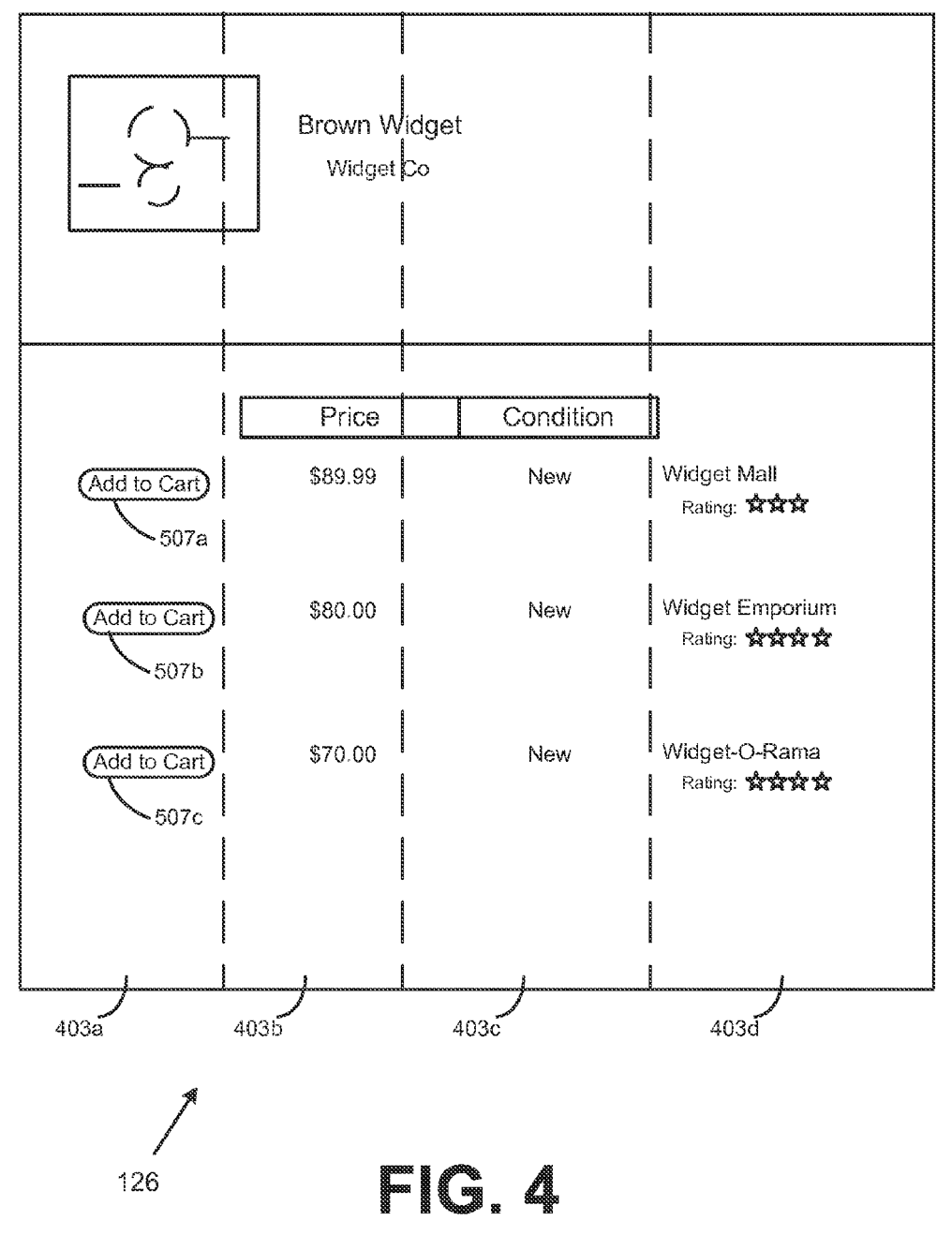

Therefore, reference is now made to FIG. 4, which continues the example of FIGS. 2 and 3. As noted above in reference to the non-limiting example of FIG. 3, the user interface element placement application 125 has identified a zone 403a of the network page 126 in which the identified high value area is located. Accordingly, the user interface element placement application 125 can facilitate placement of user interface elements that are closer to these high value areas, as the user has demonstrated a tendency to idle a mouse pointer in or near these areas. These user interface elements can include those with which an operator of a content delivery system 119 wishes to encourage a user to interact. Accordingly, in this example, the content delivery system 119 can encode a network page with purchasing user interface elements 507 in the zone 403a corresponding with the identified high value areas. It should be appreciated that the content delivery system 119 can encode a network page 126 with other user interface elements, such as, an interactive advertisement, data input fields, or other user interface elements with which an operator may wish to encourage a user to interact.

As depicted in the network pages 126 of FIG. 2, the purchasing user interface elements 507 are located in zone 403d, which are located further away from the zone 403a in which the user has demonstrated a tendency to idle a mouse pointer. Accordingly, by placing the purchasing user interface elements 507 closer to the zone 403a in which the user has demonstrated a tendency to idle a mouse pointer, the user may, in some embodiments, be more likely to select one of these user interface elements.

To facilitate the generating of network pages 126 with certain user interface elements placed in high value areas of the network page 126, the data store 116 can maintain multiple network page templates 133 for a given user interface. In the depicted examples, FIGS. 2 and 4 both correspond to the same user interface, a product detail page, in that they display the same data to the user on a client 106. However, these examples differ in that they can be generated with different network page templates 133. A network page template 133, from which the network page 126 of FIG. 4 can be generated, places the purchasing user interface elements 507 in a zone 403a, where the high value areas are located. In this way, the content delivery system 119 can facilitate placement of certain user interface elements in or near high value areas while still conforming to network page templates 133 that are defined in the network page data 131.

Figure 5:
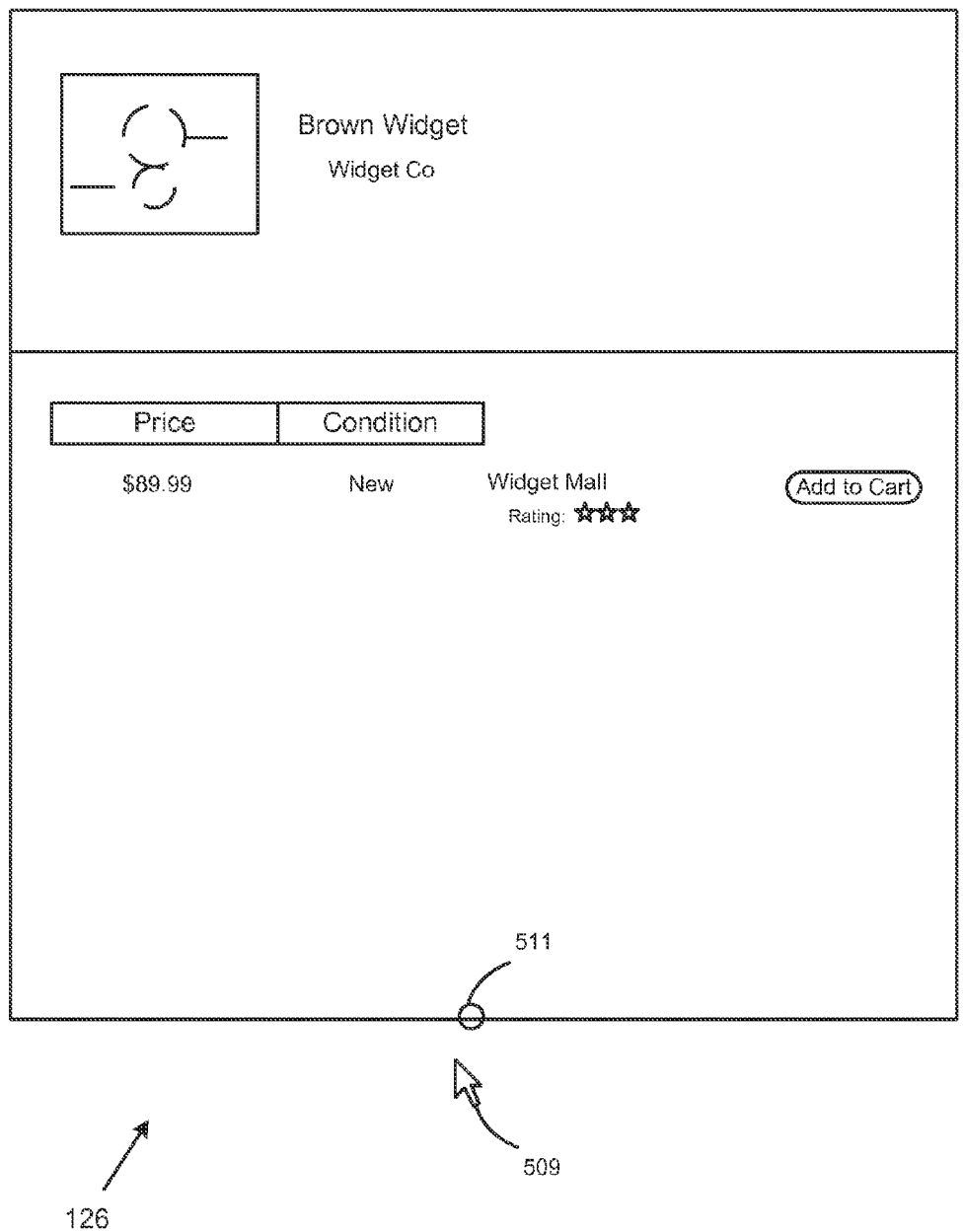
FIG. 5 is a drawing of a network page generated in the networked environment of FIG. 1 according to various embodiment of the present disclosure.

Reference is now made to FIG. 5, which depicts an alternative non-limiting example of a user interface element placement application 125 identifying high value areas of a network page 126. In the depicted example, a user on a client 106 may have a tendency to idle a mouse pointer 509 outside of a network page 126 and/or a browser window of a browser application 143. The user may exhibit this tendency if the navigation input data transmitted to the user interface element placement application 125 reveals that the mouse pointer 509 is most often outside the network page 126 for a given network page view 126, session 149, or across multiple sessions 149 associated with the user 147 data.

Additionally, in some embodiments, it may be infeasible or impossible for client side code, such as Javascript, that is embedded in a network page 126 by the content delivery system 119 to track navigation input data such as a mouse pointer position when the mouse pointer is not located within the network page 126. Accordingly, the client side code embedded in the network page 126 by the content delivery system 119 can transmit navigation input data to the user interface element placement application 125 that reflects an exit point 511 of the mouse pointer 509 from the network page 126 and/or browser window.

Figure 6:
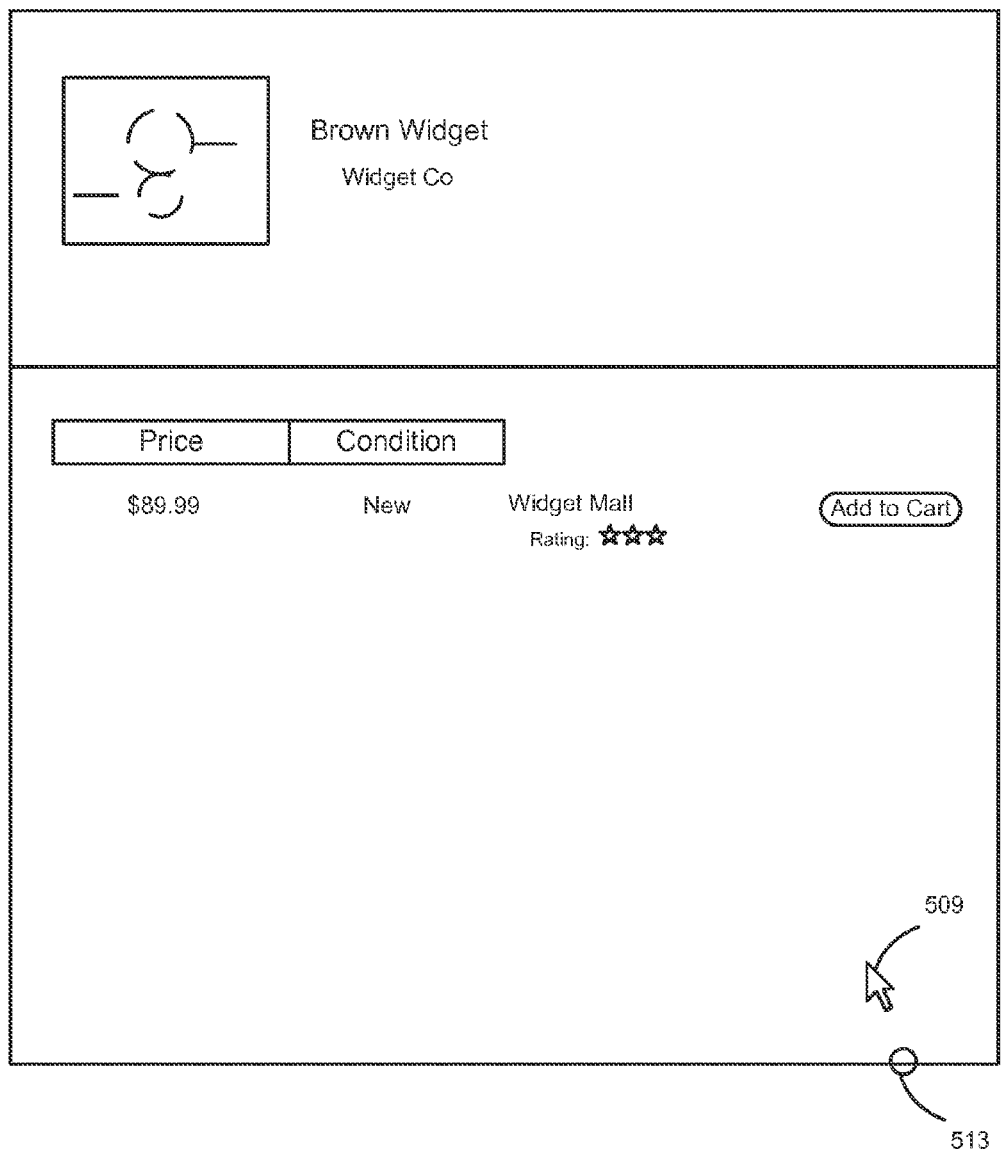
FIG. 6 is a drawing of a network page generated in the networked environment of FIG. 1 according to various embodiment of the present disclosure.

Continuing the above example, reference is now made to FIG. 6. In the depicted example, the user interface element placement application 125 can receive navigation input data from client side code embedded in the network page 126 by the content delivery system 119 and detect that a user has returned the mouse pointer 509 over the network page 126 and/or browser window of the browser application 143. Accordingly, the user interface element placement application 125 can identify an entry point 513 associated with this event. Therefore, the user interface element placement application 125 can identify both the exit point 511 (FIG. 5) and entry point 513 as potential high value areas, as the user has demonstrated a tendency to idle the mouse pointer 509 as well as a tendency to enter and/or exit the network page 126 with the mouse pointer at identifiable entry points and/or exit points.

Figure 7:
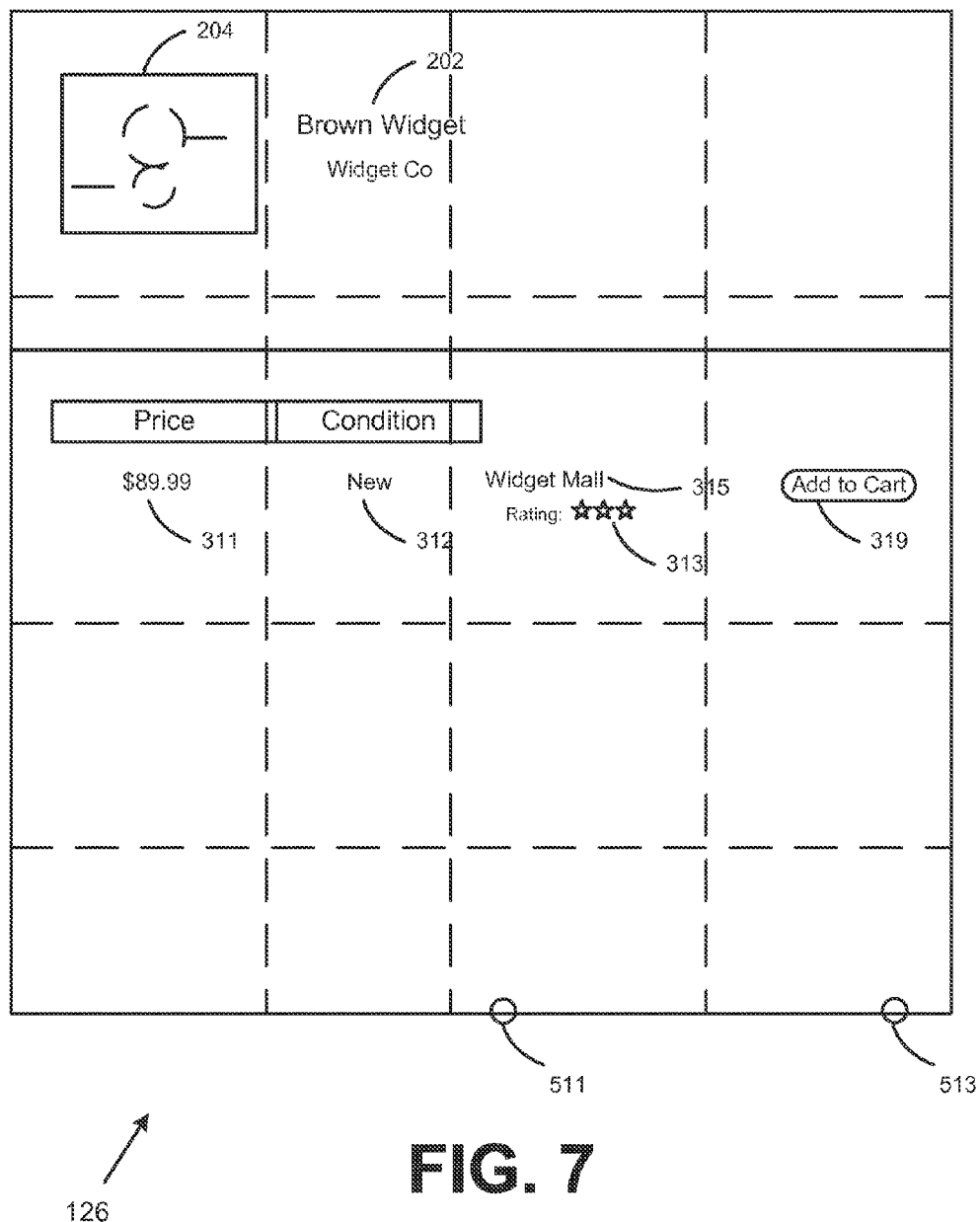
FIG. 7 is a drawing of a navigation input data map generated by the user interface placement application in the networked environment of FIG. 1 according to various embodiment of the present disclosure.

Reference is now made to FIG. 7, which continues the example of FIGS. 5 and 6. FIG. 7 depicts a navigation input data map generated by the user interface element placement application 125, which divides the network page 126 into various zones. In contrast to the previous example of FIGS.

2-4, in this example, the user interface element placement application 125 can generate a navigation input data map that divides the network page 126 into various zones across two dimensions. Accordingly, the user interface element placement application 125 can identify the exit point 511 and/or entry point 513 as high value areas of the network page 126, and facilitate placement of certain user interface elements in or near these high value areas. Therefore, the user interface element placement application 125 can facilitate encoding of a network page 126 by the content delivery system 119 that places certain user interface elements in one or both of these areas.

Figure 8:
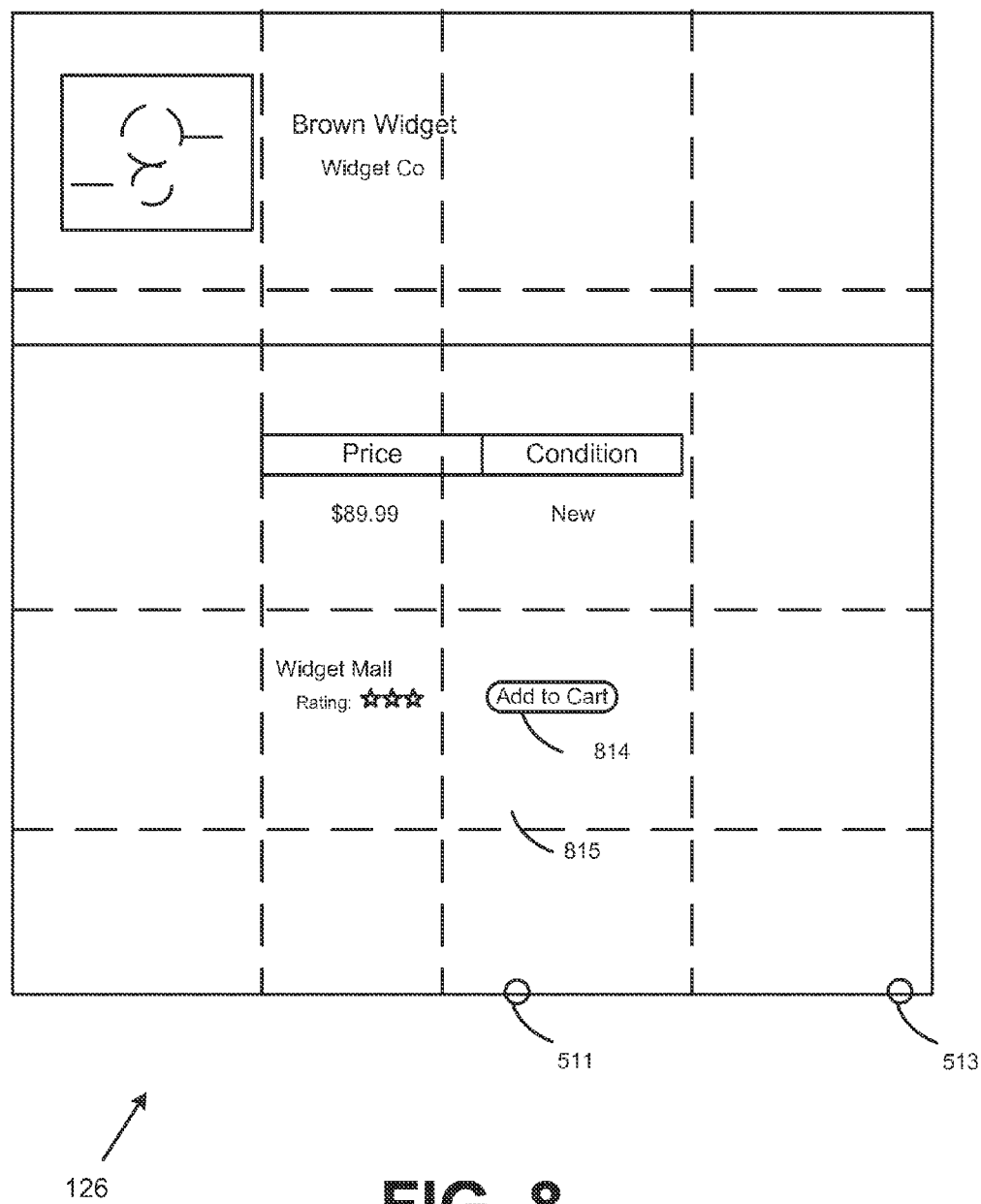
FIG. 8 is a drawing of a network page generated in the networked environment of FIG. 1 according to various embodiment of the present disclosure.

Therefore, reference is made to FIG. 8, which continues the example of FIGS. 5-7. In the non-limiting example of FIG. 8, the user interface element placement application 125 can facilitate choosing a network page template 133 that dictates placement of certain user interface elements as close as possible to one or more of the identified high value areas. As an operator of a content delivery system that 119 may wish to define network page templates 133 according to certain design rules, where user interface elements are not placed in certain zones for aesthetic reasons, the user interface element placement application 125 can choose a network page template 133 that places a purchasing user interface element 814 as close as possible one or more of the identified high value areas (e.g., the exit point 511 and entry point 513). Therefore, in this example, the user interface element placement application 125 and content delivery system 119 facilitate generating a network page 126 where the purchasing user interface element 814 is placed in a zone 815 that is as close as possible to the exit point 511 and entry point 513. It should be appreciated that in some embodiments, the user interface element placement application 125 can treat an exit point 511 and entry point 513 as a high value areas, where the user has demonstrated a tendency to idle a mouse pointer outside the network page 126 and/or browser window, and that in other embodiments, the user interface element placement application 125 can treat both an exit point 511 and entry point 513 as high value areas.

Figure 9:
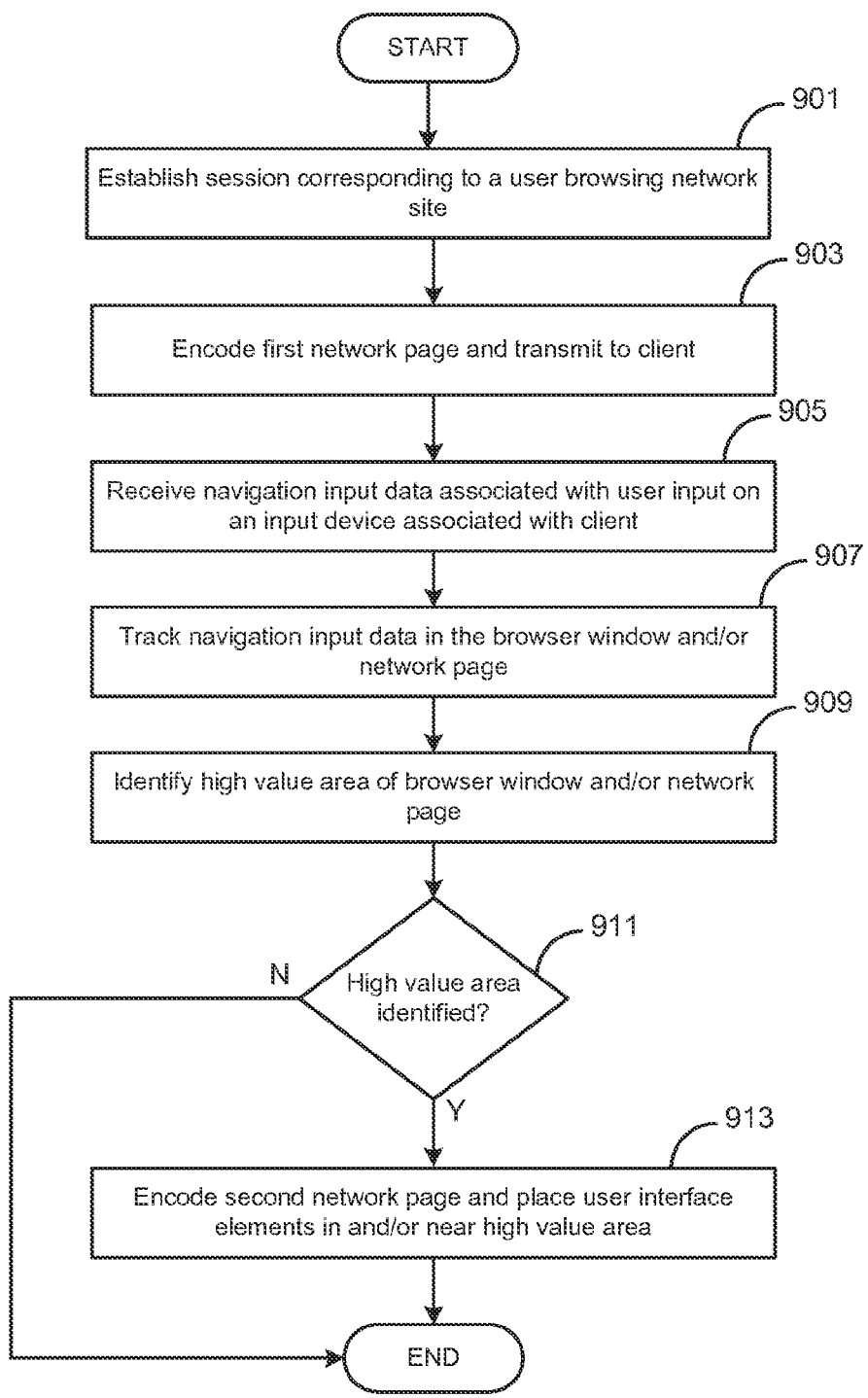
FIG. 9 is a flowchart showing execution of the content delivery system and/or user interface element placement application from the networked environment of FIG. 1

Referring next to FIG. 9, shown is a flowchart that provides one example of the operation of a portion of the content delivery system 119 and user interface element placement application 125 according to various embodiments. It is understood that the flowchart of FIG. 5 provides merely an example of the many different types of functional arrangements that may be employed to implement the operation of the portion of the content delivery system 119 and user interface element placement application 125 as described herein. As an alternative, the flowchart of FIG. 9 may be viewed as depicting an example of steps of a method implemented in the computing device 103 (FIG. 1) according to one or more embodiments.

Beginning with box 901, the user interface element placement application 125 establishes a session 149 associated with a user of the content delivery system 119. The session 149 can be used to store data regarding navigation input data associated with a user 147 during a given session or sessions. In box 903, a network page 126 (FIG. 1) is transmitted from the content delivery system 119 to a client 106 for rendering in a browser application 143. As described above, the content delivery system 119 can embed client side code in a network page 126 transmitted to the client 106 that can track navigation input of a user (e.g., mouse pointer position) and transmit the data to the user interface element placement application 125.

Accordingly, in box 907, the user interface element placement application 125 can receive navigation input data from the client 106 and, in box 909, identify potential high value areas of the network page 126 and/or browser window of the browser application 143 on a client 106. If, in box 911, a high value area is identified as described herein, in box 913 the user interface element placement application 125 and content delivery system 119 can facilitate rendering of a second network page in which certain user interface elements (e.g., a purchasing user interface element) are placed in or near the identified high value areas.

Figure 10:
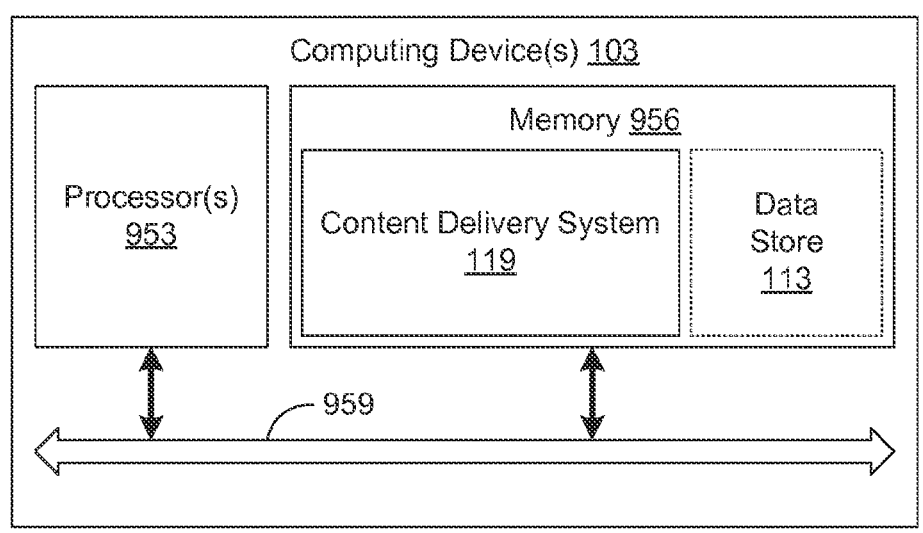
FIG. 10 is a schematic block diagram that provides one example illustration of a computing device employed in the networked environment of FIG. 1 according to various embodiments of the present disclosure.

With reference to FIG. 10, shown is a schematic block diagram of the computing device 103 according to an embodiment of the present disclosure. The computing device 103 includes at least one processor circuit, for example, having a processor 953 and a memory 956, both of which are coupled to a local interface 959. To this end, the computing device 103 may comprise, for example, at least one server computer or like device. The local interface 959 may comprise, for example, a data bus with an accompanying address/control bus or other bus structure as can be appreciated.

Stored in the memory 956 are both data and several components that are executable by the processor 953. In particular, stored in the memory 956 and executable by the processor 953 is a content delivery system 119, and potentially other applications. Also stored in the memory 956 may be a data store 116 and other data. In addition, an operating system may be stored in the memory 956 and executable by the processor 953.

It is understood that there may be other applications that are stored in the memory 956 and are executable by the processors 953 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 956 and are executable by the processor 953. In this respect, the term "executable" means a program file that is in a form that can ultimately be run by the processor 953. Examples of executable programs may be, for example, a compiled program that can be translated into machine code in a format that can be loaded into a random access portion of the memory 956 and run by the processor 953, source code that may be expressed in proper format such as object code that is capable of being loaded into a random access portion of the memory 956 and executed by the processor 953, or source code that may be interpreted by another executable program to generate instructions in a random access portion of the memory 956 to be executed by the processor 953, etc. An executable program may be stored in any portion or component of the memory 956 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 956 is defined herein as including both volatile and nonvolatile memory and data storage components. Volatile components are those that do not retain data values upon loss of power. Nonvolatile components are those that retain data upon a loss of power. Thus, the memory 956 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 953 may represent multiple processors 953 and the memory 956 may represent multiple memories 956 that operate in parallel processing circuits, respectively. In such a case, the local interface 959 may be an appropriate network 113 (FIG. 1) that facilitates communication between any two of the multiple processors 953, between any processor 953 and any of the memories 956, or between any two of the memories 956, etc. The local interface 959 may comprise additional systems designed to coordinate this communication, including, for example, performing load balancing. The processor 953 may be of electrical or of some other available construction.

Although the content delivery system 119, user interface element placement application 125, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 9 shows the functionality and operation of an implementation of portions of the user interface element placement application 125. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 953 in a computer system or other system. The machine code may be converted from the source code, etc. If embodied in hardware, each block may represent a circuit or a number of interconnected circuits to implement the specified logical function(s).

Although the flowchart of FIG. 9 shows a specific order of execution, it is understood that the order of execution may differ from that which is depicted. For example, the order of execution of two or more blocks may be scrambled relative to the order shown. Also, two or more blocks shown in succession in FIG. 9 may be executed concurrently or with partial concurrence. Further, in some embodiments, one or more of the blocks shown in FIG. 9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content delivery system 119 and/or user interface element placement application 125, that comprises software or code can be embodied in any non-transitory computer-readable medium for use by or in connection with an instruction execution system such as, for example, a processor 953 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program, when executed, configured to cause the computing device to at least:

establish a session associated with a user interacting with a network site via a browser, the network site served by the computing device to a client associated with the user;

generate a first network page associated with the network site, the first network page generated with client side code configured to track mouse pointer position data corresponding to a pointer and transmit the mouse pointer position data on a periodic basis to the computing device;

transmit the first network page to the client;

receive the mouse pointer position data from the client executing the client side code;

identify, based at least in part upon the mouse pointer position data, at least one area of a browser window as a high value area, each high value area being one of a plurality of zones within the browser window in which the user idles the mouse pointer most often relative to other areas of the browser window; and generate a second network page comprising a purchasing user interface element placed in an area of the second network page corresponding to a location of the high value area.

2. The non-transitory computer-readable medium of claim 1, wherein the plurality of zones are defined by a plurality of horizontal axes intersecting the browser window and a plurality of vertical axes intersecting the browser window.

3. A method comprising:
encoding, via at least one computing device, a first network page associated with a network site for display by a browser executed by a client;
receiving, via the at least one computing device, navigation input data associated with an input device associated with the client;
tracking, via the at least one computing device, the navigation input data relative to a browser window displaying the network page;
storing, via the at least one computing device, the navigation input data in association with a user;
identifying, via the at least one computing device, based at least in part upon the stored navigation input data, a portion of the browser window as a high value area;
identifying a network page template in which at least one user interface element is placed nearest the high value area;
retrieving the network page template from a data store in communication with the at least one computing device; and
encoding, via the at least one computing device, a second network page according to the network page template wherein the at least one user interface element is placed in an area of the second network page corresponding to the high value area.

4. The method of claim 3, wherein encoding the first network page further comprises embedding client-side code in the first network page, the client-side code configured to transmit the navigation input data from the client to the at least one computing device.

5. The method of claim 3, further comprising generating a navigation input map corresponding to the browser window, the navigation input map identifying a plurality of zones of the browser window in which navigation input data occur.

6. The method of claim 5, wherein the plurality of zones of the browser window are defined by a plurality of horizontal axes intersecting the browser window.

7. The method of claim 5, wherein the plurality of zones of the browser window are defined by a plurality of vertical axes intersecting the browser window.

8. The method of claim 5, further comprising:
determining an amount of time a pointer associated with a movement of the input device is in the plurality of zones of the browser window;
identifying a zone from the plurality of zones in which the pointer is most often located; and
identifying the zone from the plurality of zones as the high value area.

9. The method of claim 3, wherein the at least one user interface element is a hyperlink facilitating purchase of an item from an electronic commerce system.

10. The method of claim 3, wherein the at least one user interface element is a user interface element that facilitates receiving user input data from the client.

11. A system, comprising:
at least one computing device; and
a user interface element placement application executable in the at least one computing device, the user interface element placement application, when executed, causing the at least one computing device to at least:
generate and transmit a user interface to a client;
receive navigation input data associated with an input device associated with the client, the navigation input data representing a location of an input device with respect to the user interface;
track the navigation input data relative to the user interface and store the navigation input data with respect to a user;
identify, based at least in part upon the stored navigation input data associated with the user, an area of the user interface as a high value area;
identify a template in which at least one user interface element is placed nearest the high value area;
retrieve the template from a data store in communication with the at least one computing device; and
generate another user interface according to the template, wherein the at least one user interface element is placed in the area of the another user interface corresponding to the high value area.

12. The system of claim 11, wherein the user interface is generated and transmitted by embedding client-side code in the user interface, the client-side code configured to transmit the navigation input data from the client to the at least one computing device.

13. The system of claim 12, wherein the client side code detects a position of a pointer on a periodic basis and transmits to the at least one computing device the position of the pointer.

14. The system of claim 11, wherein the user interface element placement application further comprises logic that generates a navigation input map corresponding to the user interface, the navigation input map describing a plurality of zones of the user interface in which navigation input data occur.

15. The system of claim 14, wherein the plurality of zones are defined by a plurality of longitudinal axes dividing the user interface.

16. The system of claim 14, wherein the plurality of zones are defined by a plurality of horizontal axes dividing the user interface.

17. The system of claim 14, wherein the navigation input data corresponds to movement of a pointer associated with the input device in relation to the user interface.

18. The system of claim 14, wherein the user interface element placement application further causes the at least one computing device to at least:
determine an amount of time a pointer associated with a movement of the input device is in the plurality of zones of the user interface;
identify a respective zone in which the pointer is most often located; and
identify the zone as the high value area.

19. The system of claim 12, wherein the at least one user interface element is a hyperlink facilitating purchase of an item from an electronic commerce system.

20. The system of claim 12, wherein the at least one user interface element is a user interface element that facilitates receiving user input data from the client.

* * * * *